United States Patent [19]
Gucyski

[11] Patent Number: 5,892,666
[45] Date of Patent: Apr. 6, 1999

[54] PUSH-PULL SWITCHING POWER SUPPLY HAVING INCREASED EFFICIENCY AND INCORPORATING POWER FACTOR CORRECTION

[76] Inventor: Jeff Gucyski, P.O. Box 11633, Costa Mesa, Calif. 92627

[21] Appl. No.: 53,531

[22] Filed: Mar. 31, 1998

[51] Int. Cl.$^6$ .................................................. H02M 3/335
[52] U.S. Cl. ............................................. 363/24; 363/134
[58] Field of Search ................................ 363/15, 16, 24, 363/25, 26, 78, 95, 97, 98, 131, 133, 134

[56] References Cited

U.S. PATENT DOCUMENTS

| | | | |
|---|---|---|---|
| 4,628,430 | 12/1986 | Mastner | 363/25 |
| 4,656,570 | 4/1987 | Swoboda | 363/26 |
| 4,782,438 | 11/1988 | Gilliland | 363/56 |
| 4,893,227 | 1/1990 | Gallios et al. | 363/26 |
| 4,901,216 | 2/1990 | Small | 363/98 |
| 5,019,959 | 5/1991 | MacDonald et al. | 363/134 |
| 5,684,680 | 11/1997 | Tahhan et al. | 363/26 |
| 5,687,066 | 11/1997 | Cook, II | 363/89 |

*Primary Examiner*—Adolf Deneke Berhane

[57] ABSTRACT

This push-pull switching power supply outperforms its counterparts. Each switch has twice the voltage ratings. However, only two main switches have current ratings as all four switches of the full-bridge power supply. That is only one half the current ratings of both switches of the half-bridge power supply. The input voltage is applied to a center tap of transformer's primary winding. The main switches are coupled thereacross for alternately applying the primary current to ground. Two diodes apply the leakage current of the transformer to a single capacitor. One or two auxiliary switches apply the primary current to the capacitor, whereby the leakage energy stored therein is immediately returned to the transformer. The auxiliary switches operate only a mere fraction of the time and thus their peak rather than continuous current ratings matter. The efficiency is significantly increased as a passive snubber network is eliminated and a reverse energy flow is prevented. Moreover, zero voltage and zero current switching is accomplished. Power factor correction implements a current-fed mode. A parallel operation is achieved, wherein the primary current derives from the line and the capacitor. A low voltage version requires no auxiliary switches.

19 Claims, 4 Drawing Sheets

PUSH-PULL SWITCHING POWER SUPPLY HAVING INCREASED EFFICIENCY AND INCORPORATING POWER FACTOR CORRECTION

CROSS REFERENCE TO RELATED INVENTIONS

The present invention is related by subject matter to co-pending application Ser. No. 053,532 filed on even date herewith, titled "Low Noise Forward/Flyback Switching Power Supply," which is hereby incorporated by reference. This invention is also related to the following U.S. Patents by the same inventor:

U.S. Pat. Nos. 5,736,841, 5,637,988, 5,426,413, 5,382,843, 5,270,904, 5,267,132, 5,252,974, 5,225,767, 5,221,887, 5,214,430, 5,206,649, 5,196,995, 5,173,698, 5,164,657, 5,164,656, 5,155,489, 5,155,430, 5,155,381, 5,146,399, 5,099,241, 5,057,990, 5,041,832, 4,999,568, 4,980,686, 4,980,649, 4,958,155, 4,956,760, 4,949,234, 4,947,308, 4,943,740, 4,940,982, 4,940,906, 4,929,848, 4,871,980, 4,866,398, 4,857,931, 4,853,837, 4,845,391, 4,843,392, 4,837,572, 4,829,263, 4,811,017, 4,803,610, 4,782,306, 4,763,106, 4,763,080, 4,749,958, 4,749,953, 4,736,286, 4,714,894, 4,634,996 and 4,476,441.

FIELD OF THE INVENTION

The invention relates to a switching power supply (SPS) converting AC or DC input voltage into AC or DC output voltage, wherein at least two switches alternately apply a voltage to a primary winding of a power transformer.

BACKGROUND OF THE INVENTION

Today's high power SPSs are dominated by full-bridge and half-bridge SPSs. The full-bridge SPS comprises an input capacitor and two pairs of power switches. Each pair is connected across the capacitor. The primary winding of the power transformer is connected between common nodes of each pair. One switch of each pair is turned on so that the input voltage is applied across the primary winding. By switching all four switches, the polarity of the primary voltage is alternated.

The half-bridge SPS is also often used in a medium power range. The input voltage is applied to one pair of power switches. It is also usually applied to a pair of capacitors connected in series and thus constituting a voltage divider. The primary winding of the power transformer is connected between common nodes of each pair. The switches open and close in a sequence so that the capacitor voltages of opposite polarities and equal to one half the input voltage are alternately applied across the primary winding. An off-line SPS may comprise a pair of half-wave rectifiers so that the capacitors are charged to the positive and negative peaks of the line voltage.

The half-bridge SPS can also operate with a single input capacitor. The imbalance in operating flux level is corrected by an AC capacitor, which is connected in series with the primary winding. The AC capacitor must sustain peak currents of the power switches and the switching frequency of the SPS. The AC capacitor is charged to one half the input voltage. However, considering abnormal conditions such as a start-up of the SPS, the AC capacitor must sustain the input voltage.

The push-pull SPS comprises a single input capacitor and a pair of power switches. The primary winding of the power transformer has a center tap with the input voltage applied thereto. The switches are grounded and further separately connected to the primary ends. The switches open and close in a sequence so that the input voltage is alternately applied across each half of the primary winding. The winding constitutes a voltage doubler. When one switch is turned on, the voltage across the other switch is twice the input voltage.

Generally, resonant type SPSs are inherently inferior to square wave type SPSs. In the resonant type SPSs a sinusoidal voltage and/or current is developed. That, however, is associated with a considerable interval, usually near zero crossing of the respective sinusoidal signal, while a minimal or no energy transfer takes place. Therefore, the resonant SPSs require power semiconductors having higher current and/or voltage ratings. An output capacitor carries a high ripple current. By contrast, in square wave type SPSs a maximum energy transfer is accomplished instantaneously.

The resonant type SPSs have other inherent flaws. The resonant or switching frequency is determined by additional LC components, or an additional capacitor and the leakage inductance of the power transformer. These components are fixed and so is the turn-on or turn-off time. Pulse frequency modulation (PFM) rather than pulse width modulation (PWM) or other preferred switching method is often used to accomplish the regulation. A minimum load may be necessary to avoid large variations of the switching frequency. Moreover, the maximum switching frequency can be quite high if it is determined by the leakage inductance. The resonant type SPSs are preferred in special applications, such a high voltage conversion. General purpose SPS are costly and constitute a small fraction of all SPSs manufactured today.

The full-bridge, half-bridge and push-pull SPSs operating at the same input voltage and delivering the same output power can be compared. The full-bridge requires four switches to apply the input voltage across the primary winding and alternate the polarity. The half-bridge requires only two switches, whereas only one half of the input voltage is used. Consequently, currents flowing through the switches must be doubled to deliver the same output power. Moreover, the SPS requires two input capacitors or a single input capacitor and an AC capacitor carrying peak currents. The push-pull SPS applies the input voltage across separate halves of the primary winding. Only two switches have the same current ratings as four switches of the full-bridge SPS. That is also one half of the current ratings of the switches used in the half-bridge SPS.

The push-pull SPS has a lower efficiency than the full-bridge and half-bridge SPSs. When one switch of the full-bridge or half-bridge SPSs turns off, the leakage energy of the power transformer is returned to the input source. By contrast, the push-pull SPS dissipates the leakage energy in a passive snubber network. Furthermore, the switches have twice the voltage ratings. The push-pull SPS is therefore preferred when the input voltage is relatively low and/or the circuit simplicity is essential.

However, except for the above disadvantages, the push-pull SPS is inherently superior over the full-bridge and half-bridge SPSs. When one switch turns off, the input current of the full-bridge or half-bridge SPS responds in the worst possible manner. The leakage inductance of the power transformer causes the input current to change its polarity at the peak. The input capacitor or one of the series coupled input capacitors is then recharged by the current spike. This results in a voltage ripple that appears across the input of the SPS. Very often the current spike causes high frequency oscillations that are very difficult to filter. Furthermore, one or two floating power switch drivers are required. Different delay times of the floating and grounded drivers must be considered.

The input current of the push-pull SPS derives from the single capacitor and continues to flow when either switch turns off. The current is equal to the primary current that, at its peak, is replaced with the leakage current having the same amplitude and polarity. The input current is therefore unidirectional and continues to flow while being dissipated in the snubber. The primary current is conducted by only one switch and the respective half of the primary winding. Comparing with the full-bridge SPS, there are no conduction and switching losses of the additional switches. Comparing with the half-bridge SPS, there is no series coupled AC or DC capacitor and so there are no additional power losses caused by its equivalent series resistance and inductance (ESR and ESL). The switches of the push-pull SPS are grounded, which significantly simplifies a driver circuitry. The switches can be also connected to ground through a resistor for sensing the primary current and the short circuit current. Except for some noise, the voltage appearing across the resistor has one polarity.

Voltage-fed SPSs, including the full-bridge, half-bridge and push-pull SPSs referred to hereinabove, have numerous disadvantages. When the respective power switch turns off, the leakage energy stored in the power transformer is dumped directly to the input capacitor or snubber. The current drawn from the respective input capacitor reverses the polarity at its peak or, in best case, quickly drops from the peak to zero. The input current ripple reflects the secondary current of the transformer, has overlapping current transients and high frequency oscillations caused by the dumping of the leakage energy. The output inductor must carry the output current, which is usually one or two orders of magnitude larger than the input current of the SPS.

A dead time is necessary at each transition to allow the energized switch to fully turn off before the other switch turns on. However, the dead time decreases the efficiency as the SPS must switch at a duty cycle below 50%. To compensate for that, the input current must be increased, which causes higher conduction and switching losses. Moreover, during the dead time the output inductor pulls both output diodes into the conduction. This causes draining of the magnetic field from the power transformer. As the respective power switch turns on, it sees a virtual short circuit until the respective output diode is pulled out of the conduction.

A current-fed operation of the push-pull SPS is accomplished by connecting an input inductor in series with the center tap of the power transformer. The secondary voltage is rectified by a pair of diodes and applied directly to an output capacitor. The input inductor carries the input current that is usually one or two orders of magnitude smaller than the output current. Moreover, the inductor reduces an input current ripple and allows large input voltage transients. No dead time is necessary as the cross conduction current is limited by the inductor. No output inductor is required to filter the rectified output voltage of the power transformer and the related problem of the simultaneously conducting output diodes is eliminated. Furthermore, the voltage tracking between multiple outputs is significantly improved.

However, the duty cycle must remain above 50%. The switches are closed individually so that the inductor current is alternately applied to each half of the primary winding. When both switches conduct simultaneously the input inductor is charged, whereas no energy is transferred to the output. The SPS can operate at the duty cycle below 50% if an output inductor electromagnetically coupled to the input inductor is used. The output inductor and a series coupled additional diode are connected across the output capacitor. Minimum output load requirements are reduced and the output ripple voltage is minimized as the current applied to the output capacitor is continuous.

A preregulator can be also used while the push-pull section operates continuously at 50% duty cycle. The preregulator is usually a buck converter comprising an input switch, a catching diode and an output inductor. That inductor is connected in series with the center tap of the power transformer. However, this configuration has many problems. The input switch is floating and interrupts the input current. Peak currents of the input switch and catching diode can be significantly higher than an average input current. Finally, the push-pull section becomes merely an elaborate voltage amplifier having a fixed gain.

Power factor correction circuit simulates a resistive load. Line is most often used as the input source, wherein the input current is sinusoidal and matches the phase of the line voltage. A conventional power factor correction circuit employs a boost converter and operates as a preregulator of the SPS. The line voltage is rectified. A switch applies the rectified voltage across an inductor that carries the input current. Only when the switch is turned off, the energy is delivered to the input capacitor of the SPS itself. This results in peak input currents that are significantly larger than the expected input current. A sizable line filter is necessary to minimize the noise injected into the line. Moreover, the converter is coupled in series with the SPS and must sustain its full power.

SUMMARY OF THE INVENTION

The present invention is intended to provide a push-pull SPS having the expected simplicity and a significantly increased efficiency. The SPS can operate in the voltage- or current-fed mode. In the latter case, no additional output diode and no electromagnetic coupling between the input and output inductors is required even if the SPS switches at a duty cycle below 50%. The input current of the SPS is unidirectional and continues to flow after the power switches turn off. The leakage energy of the power transformer is stored in one or two capacitors and subsequently returned to the transformer for a transfer to the output of the SPS. The passive snubber network is eliminated, wherein the reverse energy flow to the input source is prevented. One or two auxiliary switches operate only a fraction of the time comparing with the main switches and thus their peak rather than continuous current ratings matter. Moreover, zero voltage and zero current switching is accomplished.

The power factor correction is performed in the current-fed mode simply by adding a line rectifier and properly operating the switches. The preferred embodiment employs a single holdup capacitor. No preregulator is employed. Moreover, a parallel operation is achieved, wherein the primary current derives from the line and the holdup capacitor. A momentary value of the input current flowing through the input inductor may be increased or decreased while the energy is delivered to the power transformer or the holdup capacitor. A low voltage version of the SPS requires no auxiliary switches.

SPS according to the present invention converts an input voltage applied between an input terminal and ground into an output voltage and comprises: an inductive means having a pair of terminals and a tap coupled to the input terminal for attaining a pair of currents and providing the output voltage; a pair of first switching means separately coupled to the inductive means terminals for selectively applying the currents to ground; a pair of capacitive means separately coupled to the inductive means terminals for storing auxiliary voltages; a pair of second switching means separately coupled in series with the capacitive means for selectively applying the currents thereto; and a pair of rectifying means separately coupled in parallel with the second switching means for rectifying the currents.

In another embodiment the SPS comprises: an inductive means having a pair of terminals and a tap coupled to the input terminal for attaining a pair of currents and providing the output voltage; a pair of first switching means separately coupled to the inductive means terminals for selectively applying the currents to ground; a capacitive means having a terminal for storing an auxiliary voltage; a second switching means coupled to one inductive means terminal for selectively applying the respective current to the capacitive means terminal; and a pair of rectifying means separately coupled to the inductive means terminals for applying the currents to the capacitive means terminal.

In yet another embodiment the SPS comprises: an inductive means having a pair of terminals and a tap coupled to the input terminal for attaining a pair of currents and providing the output voltage; a pair of rectifying means coupled to ground and having a pair of terminals for rectifying the currents; a pair of switching means with one switching means coupled to one inductive means terminal for selectively applying the respective current to one rectifying means terminal and with the other switching means coupled to the other inductive means terminal for selectively applying the respective current to the other rectifying means terminal; and a pair of capacitive means for storing auxiliary voltages with one capacitive means coupled between the one inductive means terminal and the other rectifying means terminal, and with the other capacitive means coupled between the other inductive means terminal and the one rectifying means terminal.

BRIEF DESCRIPTION OF THE DRAWINGS

The present invention will become more clear in conjunction with the accompanying figures of which.

DETAILED DESCRIPTION OF THE INVENTION

Figure 1:
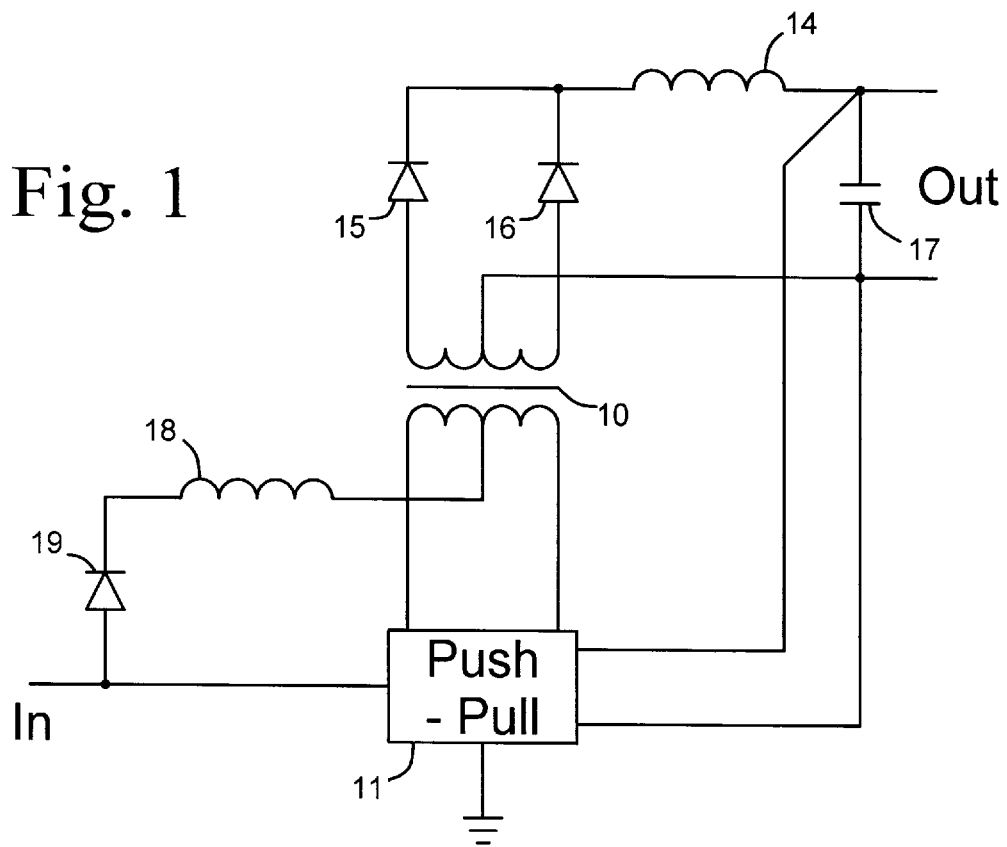
FIG. 1 is a block diagram of the SPS. The input diode and the input inductor are optional.
Figure 2:
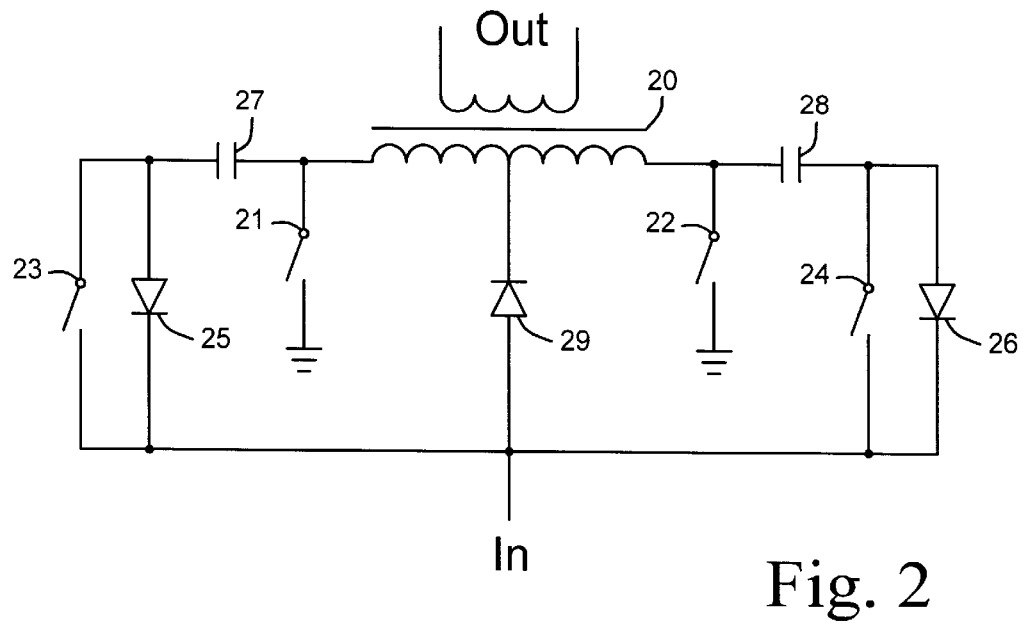
FIG. 2 is an embodiment with two capacitors coupled across the primary winding.
Figure 3:
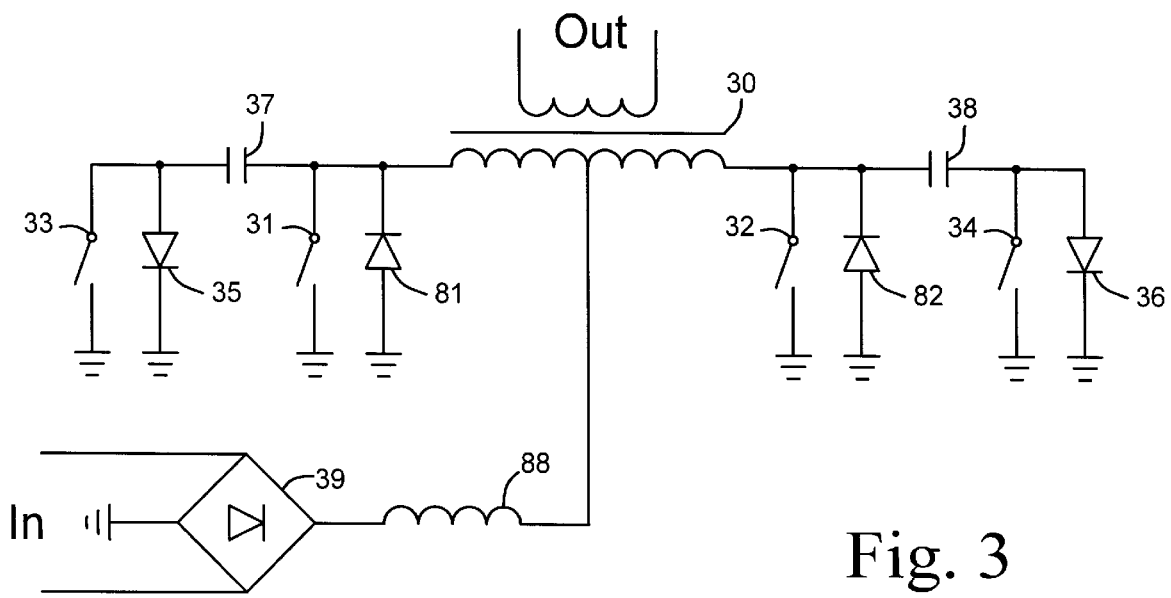
FIG. 3 is an embodiment incorporating power factor correction and comprising two holdup capacitors.
Figure 4:
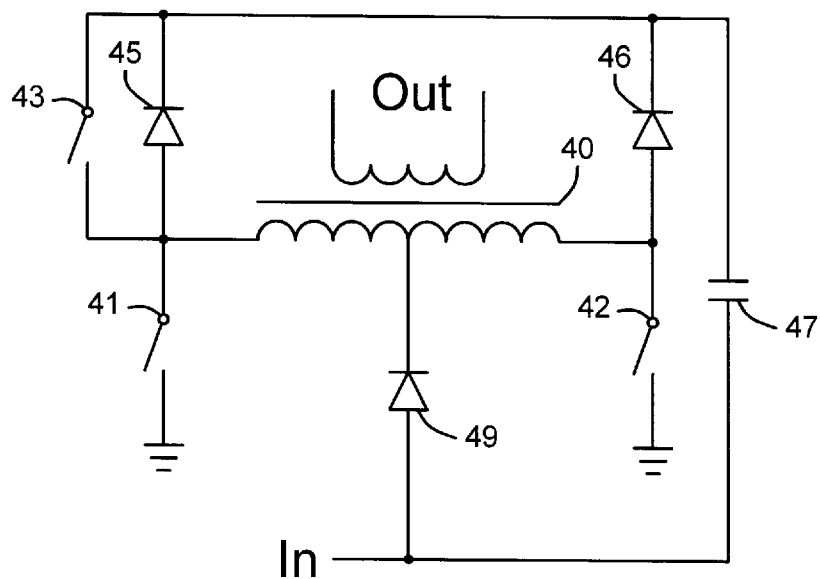
FIG. 4 is an embodiment with single capacitor connected to the input.
Figure 5:
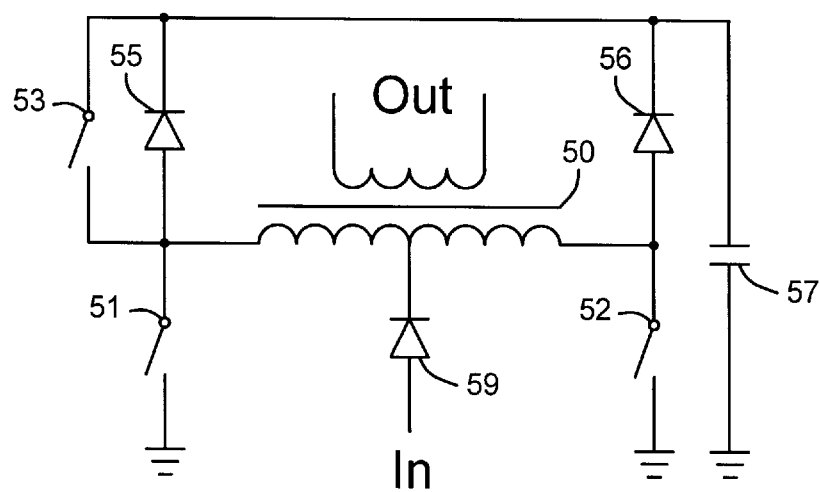
FIG. 5 is the preferred embodiment with grounded capacitor.
Figure 6:
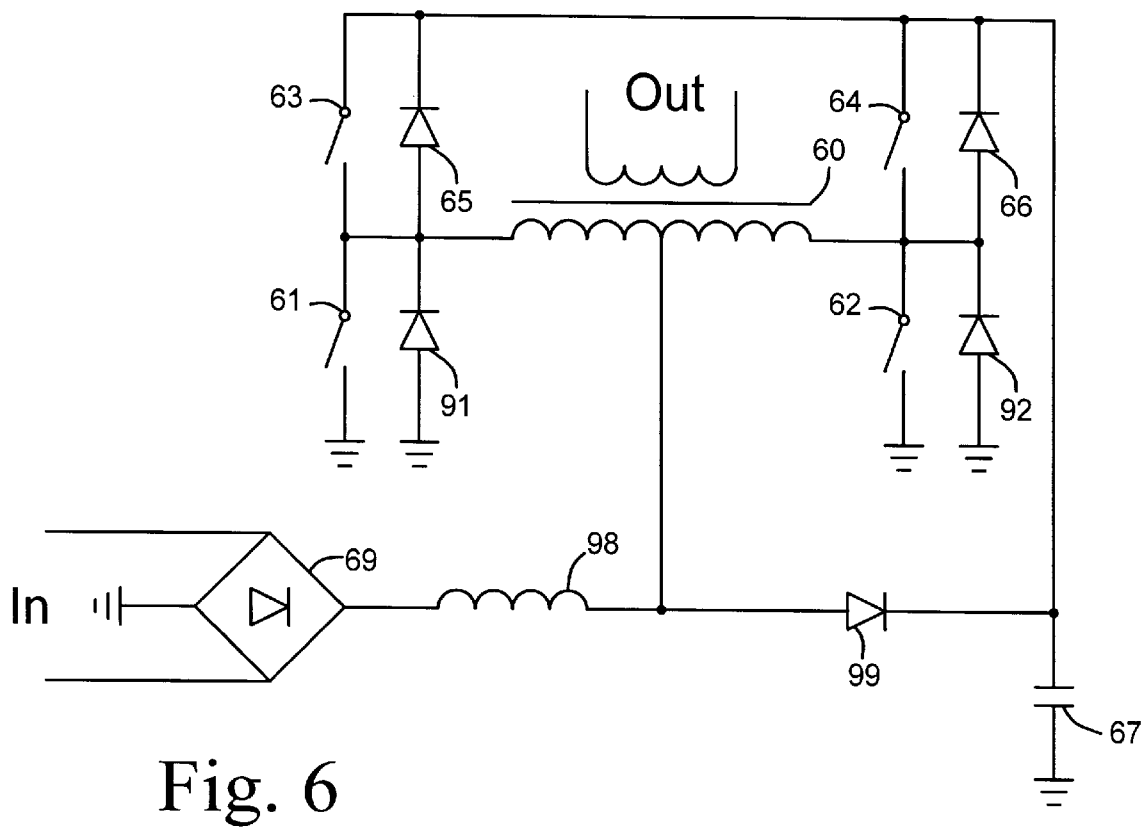
FIG. 6 is the preferred embodiment incorporating power factor correction and comprising grounded holdup capacitor.

FIG. 1 is a block diagram of the SPS. The block 11 represents the push-pull circuit according to any of the following embodiments shown in FIGS. 2 through 7. However, for the purpose of simplicity, these figures show only the primary side of a transformer corresponding to the power transformer 10. Furthermore, FIGS. 2, 4 and 5 show an input diode that corresponds to the input diode 19. FIGS. 3 and 6 show a diode bridge and an input inductor that correspond to the input diode 19 and the input inductor 18 respectively.

A tap voltage is defined as a voltage appearing at the center tap of the primary winding of the power transformer 10. The input voltage of the SPS is applied to the anode of the diode 19 and to an input of the push-pull circuit 11. The inductor 18 and the diode 19 are coupled in series between the input of the SPS and the tap. Therefore, the sum of the tap voltage, the voltage across the inductor 18 and the forward voltage of the diode 19 is equal to the input voltage. The push-pull circuit 11 comprises a pair of main switches that alternately apply the tap voltage across each half of the primary winding.

The secondary winding of the power transformer 10 has a center tap as well, wherein the output voltage of the SPS is referenced thereto. The diodes 15 and 16 have the anodes connected across the secondary winding, and the cathodes tied together. The voltage appearing between the cathodes of the diodes 15 and 16, and the secondary tap is the rectified secondary voltage of the power transformer 10. The inductor 14 attains a current in response to that voltage. The series coupled output capacitor 17 is responsive the inductor current and provides the output voltage of the SPS.

A control logic of the push-pull circuit 11 senses the output voltage of the SPS stored in the capacitor 17. The control logic may include an optocoupler for maintaining the line isolation between the input and output of the SPS. Furthermore, the control logic may include a microprocessor for controlling the switches of the push-pull circuit 11 in response to the output voltage of the SPS.

If the input inductor 18 is used, the value of the output inductor 14 can be dramatically reduced. The inductors 18 and 14 carry the input and output currents of the SPS respectively. The inductor 14 merely filters the output current as it compensates for any differences between the rectified secondary voltage and the output voltage of the SPS. The ratio of RMS values of the input and output currents is approximately equal to the ratio of the input and output voltages of the SPS. That ratio is two orders of magnitude if the SPS converts universal line voltage into a supply voltage of a modern digital circuit.

The input inductor 18 also allows that both ends of the primary winding are shorted to ground. Thus, both main switches of the push-pull circuit 11 can be activated and no dead time is necessary at each transition. However, if the SPS switches at a duty cycle below 50%, the inductor 18 acts as a large leakage inductance of the power transformer 10. The push-pull circuit 11 must recover the leakage energy stored in the power transformer 10 as well as the energy stored in the inductor 18.

The input diode 19 is optional. It ensures that the input current is unidirectional. In particular, the leakage energy of the transformer 10 and possibly inductor 18 is not dumped to the input source of the SPS. The conventional push-pull SPS dissipates that excessive energy in a passive snubber network. The push-pull SPS according to the instant invention transfers the energy to the transformer 10 and further to the output of the SPS. The undesirable reverse energy flow to the input source is prevented.

FIG. 2 is an embodiment with two capacitors coupled across the primary winding. This embodiment can be used as the push-pull circuit 11 of FIG. 1. For the purpose of simplicity, only the primary side of the power transformer 20 is shown.

The primary winding of the power transformer 20 has a center tap connected to the cathode of the diode 29. The input voltage of the SPS is applied to the anode of the diode 29. The main switches 21 and 22 are grounded and further separately connected to the primary ends. The switches 21 and 22 open and close alternately, whereby the primary current flowing in the respective half of the primary winding is applied to ground. The capacitors 27 and 28 are separately coupled directly to the primary ends and indirectly to the input of the SPS for storing auxiliary voltages. Specifically, the diodes 25 and 26 have anodes connected to the capacitors 27 and 28 respectively to apply the leakage current thereto. The cathodes of the diodes 25 and 26 are connected to the input. The auxiliary switches 23 and 24 are connected in parallel with the diodes 25 and 26 respectively. The switches 23 and 24 selectively apply the primary current to the capacitors 27 and 28 respectively. By these means, the auxiliary voltages stored therein are applied between the input and the respective primary ends. MOSFETs, IGBTs and/or bipolar transistors can be used as the switches 21 through 24. Integral reverse rectifiers of MOSFETs can be implemented as the diodes 25 and 26.

When the switch 21 is turned on, the input diode 29 conducts and the tap voltage is applied across the respective half of the primary winding. The switch 22 is turned off, wherein the voltage appearing thereacross is approximately twice the input voltage. The same voltage appears across the switch 23 and the diode 25 as the capacitors 27 and 28 are charged approximately to the input voltage. The voltage appearing across the switch 24 and the diode 26 is near zero. When the switch 21 is turned off, the leakage energy stored in the transformer 20 is transferred through the diodes 25 and 29 to the capacitor 27. When the leakage current drops to zero, these diodes are cut off and the capacitor 27 is charged to a peak voltage.

The switches 22 and 23 preferably turn on simultaneously, wherein the timing accuracy is not critical. The diode 29 is cut off as the tap voltage is greater than the input voltage of the SPS. The primary current of the transformer 20 discharges the capacitor 27 to its initial voltage. The diode 29 takes over the primary current. The switch 23 turns then off at zero voltage and zero current. Similarly, the switches 21 and 24 can turn on simultaneously. The primary current discharges the capacitor 28 to its initial voltage. It continues to flow through the diode 29. The switch 24 turns then off at zero voltage and zero current.

The diode 29 is unnecessary. The value of the capacitor 27 is preferably large enough so that the voltage increase thereacross is below a maximum allowable reverse voltage of the switch 22. This may be determined by a forward voltage of an integral reverse rectifier of the switch 22. The switch 23 turns on immediately before the switch 22 turns on. The voltage thereacross is near zero as the voltages stored in the capacitor 27 is just slightly greater than the input voltage. Therefore, the switch 22 turns on at zero voltage and zero current. The primary current of the transformer 20 discharges the capacitor 27 to its initial voltage. The switch 22 takes over the primary current. The switch 23 turns then off at zero voltage and zero current. The same remarks apply to the switches 21 and 24 since the embodiment is symmetrical.

An input inductor, such as 18 of FIG. 1, can be used to accomplish the current-fed operation of the SPS. The series coupled diode 29 is used only if it is necessary to prevent a reverse current in the inductor. The input inductor acts as a large leakage inductance of the power transformer 20 if the duty cycle of the switching period is below 50%. However, both switches 21 and 22 can turn on simultaneously.

FIG. 3 is an embodiment incorporating power factor correction and comprising two holdup capacitors. This embodiment is based on FIG. 2. However, the switches 33, 34 and the cathodes of the diodes 35, 36 are connected to ground rather than the input of the SPS. The single diode connected in series with the input is replaced with the diode bridge 39. The input voltage of the SPS is applied thereacross, whereas the rectified input voltage is referenced to ground. Three components are added. The input inductor 88 is connected between the output of the diode bridge 39 and the tap. The diodes 81 and 82 are connected in parallel with the switches 31 and 32 respectively. The embodiment can be used as the push-pull circuit 11 of FIG. 1, whereas the diode bridge 39 represents the input rectifier. For the purpose of simplicity, only the primary side of the power transformer 30 is shown.

A DC source having either polarity can be applied across the diode bridge 39. If the inductor 88 is not used, the circuit operation is nearly identical to that of the FIG. 2 embodiment. In particular, the switches 31, 34 or 32, 33 preferably turn on simultaneously, wherein the timing accuracy is not critical. The respective switch 33 or 34 turns then off at zero voltage and zero current. However, the capacitors 37 and 38 are initially charged to approximately twice the input voltage. Furthermore, the input current of the SPS is not abruptly interrupted. It rather fades out as the rectifiers 35 or 36, and 39 conduct the leakage current. The input current may remain uninterrupted if the inductor 88 is used to accomplish the current-fed operation of the SPS.

When the input voltage is AC, in particular the line voltage, the diode bridge 39 provides a rectified voltage. The power factor correction is accomplished by matching the waveform and the phase of the input current with the line voltage. The peak power delivered to the SPS may be significantly greater than that delivered to the load, especially when the load fluctuates. The residue energy is stored in the holdup capacitors 37 and 38. Because the instant and maximum allowable holdup voltages are known, the amplitude of the input current can be determined for each period of the line voltage.

The switching sequence is different than it is in case of the DC input source continuously providing a sufficient voltage. Specifically, when the switches 31 and 34 are turned on, the primary current discharges the capacitor 38. The switch 31 turns off first, wherein the leakage current flows through the capacitor 37 and the diode 35 to ground. The input current, if any, continues to flow through the respective diode and the capacitor that stores a smaller holdup voltage. Therefore, the current discharging the capacitor 38 either ceases to flow or is replaced with the input current that charges it. The switch 34 turns off at zero voltage and zero current. Similarly, when the switches 32 and 33 are turned on, the primary current discharges the capacitor 37. The switch 32 turns off first. Subsequently, the switch 33 turns off at zero voltage and zero current. If the switch 33 or 34 can not turn off at zero current, an overvoltage protection is necessary. The diodes 81 and 82 apply the leakage current to ground and limit reverse voltages across the switches 31 and 32 respectively.

The SPS performs the regulation by maintaining the output voltage within a predetermined range. The secondary voltage is determined by the primary voltage appearing between the tap and either primary end. The rectified secondary voltage appears at the cathodes of the output diodes such as 15 and 16 shown in FIG. 1. The secondary current flows through the output inductor such as 14 of FIG. 1. The secondary current increases if the rectified secondary voltage is greater than the output voltage of the SPS. Otherwise, the current decreases. The output voltage is stored in the output capacitor such as 17 of FIG. 1. It increases if the secondary current is greater than the output current of the SPS. Otherwise, the output voltage decreases.

Therefore, the operation of the SPS can be analyzed in terms of only two signals: the current flowing through the inductor 88, and the primary voltage. The input current of the SPS is equal to the inductor current. The primary voltage determines the secondary voltage and further the secondary current. The input current and the primary voltage have to be increased or decreased preferably independently of each other at each switching cycle. Moreover, the holdup voltages stored in the capacitors 37 and 38 have to be maintained within a specific range. However, these capacitors have large values. The holdup voltages have to be corrected during each period of the rectified line voltage rather than each switching cycle of the SPS. The holdup time is determined by the length of time that the SPS must be capable of running when line fails.

The input current increases when the switch 31 or 32 is turned on while the switches 33 and 34 are turned off. The only exception is zero crossing of the line voltage when the input current is zero. The inductor 88 and the respective half of the primary winding constitute a voltage divider. If the corresponding rectified secondary voltage is greater than the output voltage of the SPS, the secondary current increases as well. If that is undesirable, both switches 31 and 32 can turn on simultaneously. Both currents decrease when all switches 31 through 34 are off.

The input current decreases, or remains zero, and the primary voltage is highest when the switches 31, 34 or 32, 33 are turned on. These pairs of switches can turn on and off alternately, particularly near zero crossing of the line voltage. The respective holdup voltages are then alternately applied across the primary winding to increase the secondary current. The tap voltage is one half of the respective holdup voltage and is greater than the peak of the rectified line voltage.

The holdup voltages stored in the capacitors 37 and 38 are automatically adjusted to equal values, wherein no matching of the capacitor values is necessary. At least one holdup voltage increases when the switches 31 and 32 are turned off while the leakage current or the input current is present. The respective diode 35 or 36 applies that current to ground. Furthermore, a larger portion of the input current charges the capacitor that stores a smaller voltage. While the diode 35 or 36 conducts, the respective switch 33 or 34 can turn on at zero voltage and zero current.

For example, the capacitor 37 may store a smaller holdup voltage than the capacitor 38. The input current charges the capacitor 37. The difference between the tap voltage and the holdup voltage of the capacitor 37 appears across the respective half of the primary winding. If the sum of that differential voltage and the tap voltage is approximately equal to the holdup voltage stored in the capacitor 38, the input current charges both capacitors 37 and 38. A portion of the input current charging the capacitor 38 increases with decreasing differential voltage. When the differential voltage is zero, both capacitors 37 and 38 equally share the input current. The primary current discharges the capacitor 37 or 38 when the switches 32, 33 or 31, 34 are turned on respectively.

The significant advantage of the embodiment is that all switches 31 through 34 are grounded. By contrast, only the two main switches are grounded in the embodiments of FIGS. 2 and 4 through 6. MOSFETs, IGBTs and/or bipolar transistors can be used as the switches 31 through 34. For example, N-channel MOSFETs operating as the switches 31, 32 and 33, 34 have sources and drains grounded respectively. Their integral reverse rectifiers can be implemented as the diodes 81, 82 and 35, 36 respectively. A driver circuit requires a positive supply voltage to turn on any of the switches 31 through 34. The gates of the switches 33 and 34 also require negative voltages. However, each switch 31 through 34 turns off simply by shorting out its gate and source. Therefore, the driver circuit has to sustain negative gate and source voltages of the switches 33 and 34 but does not require a negative supply voltage.

FIG. 4 is an embodiment with single capacitor connected to the input of the SPS. This embodiment can be used as the push-pull circuit 11 of FIG. 1. For the purpose of simplicity, only the primary side of the power transformer 40 is shown.

The primary winding of the power transformer 40 has a center tap connected to the cathode of the diode 49. The input voltage of the SPS is applied to the anode of the diode 49. The main switches 41 and 42 are grounded and further separately connected to the primary ends. The switches 41 and 42 open and close alternately, wherein the primary current flowing in the respective half of the primary winding is applied to ground. The capacitor 47 is connected to the input for storing an auxiliary voltage. The diodes 45 and 46 have cathodes connected to the capacitor 47 to apply the leakage current thereto. The anodes of the diodes 45 and 46 are connected across the primary winding. The auxiliary switch 43 is connected in parallel with the diode 45 for selectively applying the primary current to the capacitor 47. MOSFETs, IGBTs and/or bipolar transistors can be used as the switches 41 through 43.

When the switch 41 is turned on, the input diode 49 conducts and the tap voltage is applied across the respective half of the primary winding. The switch 42 is turned off, wherein the voltage appearing thereacross is approximately twice the input voltage. The same voltage appears across the switch 43 and the diode 45 as the capacitor 47 is charged approximately to the input voltage. The voltage appearing across the diode 46 is near zero. When the switch 41 is turned off, the leakage energy stored in the transformer 40 is transferred through the diodes 45 and 49 to the capacitor 47. When the leakage current drops to zero, these diodes are cut off and the capacitor 47 is charged to a peak voltage.

The switches 42 and 43 preferably turn on simultaneously, wherein the timing accuracy is not critical. The diode 49 is cut off as the tap voltage is greater than the input voltage of the SPS. The primary current of the transformer 40 discharges the capacitor 47 to its initial voltage. The diode 49 takes over the current. The switch 43 turns then off at zero voltage and zero current.

The diode 49 is unnecessary. The value of the capacitor 47 is preferably large enough so that the voltage increase thereacross is below a maximum allowable reverse voltage of the switch 42. This may be determined by a forward voltage of an integral reverse rectifier of the switch 42. The switch 43 turns on immediately before the switch 42 turns on. The voltage thereacross is near zero as the voltages stored in the capacitor 47 is just slightly greater than the input voltage. Therefore, the switch 42 turns on at zero voltage and zero current. The primary current of the transformer 40 discharges the capacitor 47 to its initial voltage.

The switch 42 takes over the primary current. The switch 43 turns then off at zero voltage and zero current.

An input inductor, such as 18 of FIG. 1, can be used to accomplish the current-fed operation of the SPS. The series coupled diode 49 is used only if it is necessary to prevent a reverse current in the inductor. The input inductor acts as a large leakage inductance of the power transformer 40 if the duty cycle of the switching period is below 50%. However, both switches 41 and 42 can turn on simultaneously. Both switches 42 and 43 must be closed to discharge the capacitor 47.

FIG. 5 is the preferred embodiment with grounded capacitor. The embodiment can be used as the push-pull circuit 11 of FIG. 1. For the purpose of simplicity, only the primary side of the power transformer 50 is shown.

The embodiment is nearly identical to that shown in FIG. 4. Consequently, the circuit operation is almost the same. In particular, the switches 52 and 53 preferably turn on simultaneously, wherein the timing accuracy is not critical. The switch 53 turns then off at zero voltage and zero current. The capacitor 57 can be sufficiently large so that the diode 59 is unnecessary. The switch 52 turns then on at zero voltage and zero current.

However, the capacitor 57 is connected to ground rather than the input of the SPS. The capacitor 57 is initially charged to approximately twice the input voltage. Furthermore, the input current of the SPS is not abruptly interrupted. It rather fades out as the diodes 55 or 56, and 59 conduct the leakage current. The input current may remain uninterrupted if an input inductor, such as 18 of FIG. 1, is used to accomplish the current-fed operation of the SPS.

FIG. 6 is the preferred embodiment incorporating power factor correction and comprising grounded holdup capacitor. This embodiment is based on FIG. 5, wherein the diode bridge 69 is substituted for the input diode 59. Several components are added. The auxiliary switch 64 is connected in parallel with the diode 66. The diodes 91 and 92 are connected in parallel with the switches 61 and 62 respectively. The input inductor 98 is connected between the output of the diode bridge 69 and the tap. The diode 99 is connected between the tap and the capacitor 67. The embodiment can be used as the push-pull circuit 11 of FIG. 1, wherein the diode bridge 69 represents the input rectifier. For the purpose of simplicity, only the primary side of the power transformer 60 is shown.

The power factor correction is accomplished by matching the waveform and the phase of the input current with the line voltage. As pointed out hereinabove, the operation of the SPS can be analyzed in terms of only two signals: the input current flowing through the inductor 88, and the primary voltage. The primary voltage appears between the tap and either primary end. It determines the secondary voltage and further the secondary current.

AC input voltage, in particular the line voltage, is applied across the diode bridge 69. The bridge 69 provides the rectified line voltage that is referenced to ground. The input inductor 98 is connected in series with the tap and carries the input current of the SPS. The holdup capacitor 67 compensates for differences between the energy received by the SPS and delivered to the load. The capacitor 67 has a large value and is capable of providing the energy during the holdup time.

The input current increases when the switch 61 or 62 is turned on while the switches 63 and 64 are turned off. The only exception is zero crossing of the line voltage when the input current is zero. The inductor 98 and the respective half of the primary winding constitute a voltage divider. If the corresponding rectified secondary voltage is greater than the output voltage of the SPS, the secondary current increases as well. If that is undesirable, both switches 61 and 62 can turn on simultaneously. Both currents decrease when all switches 61 through 64 are open.

The input current decreases, or remains zero, and the secondary current increases when the switches 61, 64 and 62, 63 are turned on. These pairs of switches can turn on and off alternately, particularly near zero crossing of the line voltage. The voltage applied across the primary winding is the holdup voltage with alternating polarity. The tap voltage is one half the holdup voltage and is greater than the peak of the rectified line voltage.

The switches 63 and 64 turn on and off at zero voltage and zero current. The switch 63 or 64 turns on immediately after the switch 61 or 62 turns off while the diode 65 or 66 conducts, respectively. The switch 63 or 64 turns off immediately after the switch 62 or 61 turns off while the diode 65 or 66 conducts, respectively. If the switches 63 and 64 are open, one or both diodes 65 and 66 conduct the leakage current or at least a portion of the input current.

During the zero crossing of the line voltage, the input current flowing through the inductor 98 is zero. The switching sequence is therefore somewhat different. The pairs of switches 61, 64 and 62, 63 turn on and off alternately. When the switches 61 and 64 are turned on, the switch 61 turns off first. Subsequently, the switch 63 turns on while the switch 64 remains closed. Finally, the switch 64 turns off and the switch 62 turns on. This completes the first half of the switching cycle. During the second half the switching is executed in the reverse order, i.e., 62 off, 64 on, 63 off and 61 on.

The leakage current charges the capacitor 67 only when the switch 61 turns off while the switch 62 remains closed, or vice versa. Otherwise, the input current overlaps the leakage current. The input current of the SPS charges the capacitor 67 when both switches 61 and 62 are turned off. The primary current discharges the capacitor 67 when the switches 61, 64 or 62, 63 are turned on. If the switch 63 or 64 can not be turn off at zero current, an overvoltage protection is necessary. The diodes 91 and 92 apply the leakage current to ground and limit reverse voltages across the switches 61 and 62 respectively.

The optional diode 99 is connected between the tap and the capacitor 67 to limit an excessive tap voltage. Moreover, the efficiency of the SPS is improved. The diode 99 applies a portion of the input current directly to the holdup capacitor 67 when the switches 61 and 62 are turned off. The remaining portion of the input current flowing through the primary winding and the diodes 65, 66 is minimized. MOSFETs, IGBTs and/or bipolar transistors can be used as the switches 61 through 64. Integral reverse rectifier of MOSFETs can be implemented as the respective diodes 91, 92, 65 and 66. The diode 99 is then particularly effective due to increased forward voltages of the integral reverse rectifiers.

The significant advantage of the embodiment is the single holdup capacitor 67. Moreover, a holdup capacitor in a conventional SPS or a power factor correction circuit stores a voltage that is usually slightly greater than the peak of the line voltage. The holdup voltage stored in the capacitor 67 is at least twice the peak of the line voltage. The energy stored in the capacitor 67 is proportional to the square of the holdup voltage, whereby its capacitance is reduced four times.

Figure 7:
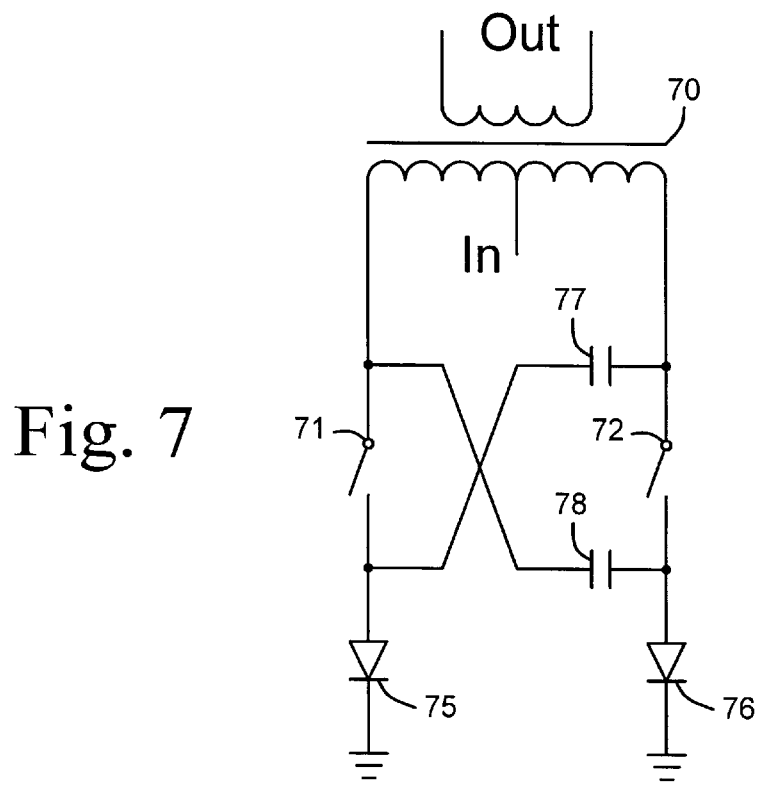
FIG. 7 is the preferred embodiment comprising no auxiliary switches, particularly for low input voltage.

FIG. 7 is the preferred embodiment comprising no auxiliary switches, particularly for low input voltage. This embodiment can be used as the push-pull circuit 11 of FIG. 1. For the purpose of simplicity, only the primary side of the power transformer 70 is shown.

The primary winding of the power transformer 70 has a center tap connected to the input of the SPS. The switches 71 and 72 are separately connected to the primary ends and further to the anodes of the diodes 75 and 76 respectively. The cathodes of the diodes 75 and 76 are grounded. The capacitors 77 and 78 store auxiliary voltages and are connected to the anodes of the diodes 75 and 76 respectively. The capacitors 77 and 78 are further connected to the primary ends to which the switches 72 and 71 are connected respectively.

When the switch 71 is turned on, the voltage stored in the capacitor 77 is applied across the primary winding. That voltage is initially greater than twice the input voltage and the diode 75 is reverse biased. The primary current discharges the capacitor 77 and eventually the diode 75 takes over the primary current of the transformer 70. Both capacitors 77 and 78 are then charged approximately to twice the input voltage and are also effectively coupled in series through the switch 71. Therefore, the voltage appearing across the complementary switch 72 is approximately four times the input voltage. When the switch 71 is turned off, the leakage energy stored in the transformer 70 is transferred to the capacitor 78. The diode 76 conducts until the capacitor 78 is charged to a peak voltage or the switch 72 turns on.

Similarly, when the switch 72 is turned on, the voltage stored in the capacitor 78 is applied across the primary winding. The primary current discharges the capacitor 78 and eventually the diode 76 takes over the primary current. When the switch 72 is turned off, the leakage energy stored in the transformer 70 is transferred to the capacitor 77. The diode 75 conducts until the capacitor 77 is charged to a peak voltage or the switch 71 turns on.

An input inductor, such as 18 of FIG. 1, can be used to accomplish the current-fed operation of the SPS. The input inductor acts as a large leakage inductance of the power transformer 70. However, in contrast to the previous embodiments, the duty cycle of the switching period must always remain below 50%. The switches 71 and 72 must not turn on simultaneously as to avoid a short circuit condition. An input diode as 19 of FIG. 1 or a diode bridge as 69 of FIG. 6 can be connected in series with the tap to rectify the input voltage of the SPS.

The embodiment is particularly suitable for a low voltage operation. For example, if the input source is a 12V battery, voltage ratings of the switches 71 and 72 may be 50V. This is often the smallest voltage rating of power transistors offered by manufacturers. Voltage ratings of the diodes 73 and 74, and capacitors 77 and 78 may be 25V. If the SPS is used in a distributed power system providing 48V, voltage ratings of the switches may be 200V, and 100V of the diodes and capacitors.

MOSFETs, IGBTs or bipolar transistors can be used as the switches 71 and 72. For example, N-channel MOSFETs have sources connected to the anodes of the diodes 75 and 76 respectively. A driver circuit requires a positive supply voltage to turn on the switches 71 and 72. The gates thereof also require negative voltages. However, each switch turns off simply by shorting out its gate and source. Therefore, the driver circuit has to sustain negative gate and source voltages but does not require a negative supply voltage.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting an input voltage applied between an input terminal and ground into an output voltage comprising:

an inductive means having a pair of terminals and a tap coupled to the input terminal for attaining a pair of currents and providing the output voltage;

a pair of first switching means separately coupled to the inductive means terminals for selectively applying the currents to ground;

a pair of capacitive means separately coupled to the inductive means terminals for storing auxiliary voltages;

a pair of second switching means separately coupled in series with the capacitive means for selectively applying the currents thereto; and a pair of rectifying means separately coupled in parallel with the second switching means for rectifying the currents.

2. Switching power supply of claim 1 further including a second rectifying means coupled to the tap for rectifying a second input voltage and providing first said input voltage.

3. Switching power supply of claim 1 further including a second inductive means coupled in series with the tap for attaining a second current.

4. Switching power supply of claim 1 further including a pair of second rectifying means separately coupled in parallel with the first switching means for rectifying the currents.

5. Switching power supply of claim 1 wherein first said inductive means includes:

a primary inductive means for attaining the currents; and a secondary inductive means electromagnetically coupled to the primary inductive means for providing the output voltage.

6. Switching power supply of claim 1 further including:

a second rectifying means for rectifying first said output voltage;

a second inductive means coupled to the second rectifying means for attaining a second current; and a second capacitive means coupled to the second inductive means for storing a second output voltage.

7. Switching power supply converting an input voltage applied between an input terminal and ground into an output voltage comprising:

an inductive means having a pair of terminals and a tap coupled to the input terminal for attaining a pair of currents and providing the output voltage;

a pair of first switching means separately coupled to the inductive means terminals for selectively applying the currents to ground;

a capacitive means having a terminal for storing an auxiliary voltage;

a second switching means coupled to one inductive means terminal for selectively applying the respective current to the capacitive means terminal; and a pair of rectifying means separately coupled to the inductive means terminals for applying the currents to the capacitive means terminal.

8. Switching power supply of claim 7 further including a third switching means coupled to the other inductive means terminal for selectively applying the respective current to the capacitive means terminal.

9. Switching power supply of claim 7 further including a second rectifying means coupled between the capacitive means terminal and the tap for limiting a voltage appearing thereat.

10. Switching power supply of claim 7 further including a second rectifying means coupled to the tap for rectifying a second input voltage and providing first said input voltage.

11. Switching power supply of claim 7 further including a second inductive means coupled in series with the tap for attaining a second current.

12. Switching power supply of claim 7 further including a pair of second rectifying means separately coupled in parallel with the first switching means for rectifying the currents.

13. Switching power supply of claim 7 wherein first said inductive means includes:

a primary inductive means for attaining the currents; and a secondary inductive means electromagnetically coupled to the primary inductive means for providing the output voltage.

14. Switching power supply of claim 7 further including:

a second rectifying means coupled to the inductive means for rectifying first said output voltage;

a second inductive means coupled to the second rectifying means for attaining a second current; and a second capacitive means coupled in series with the second inductive means for providing a second output voltage in response to the second current.

15. Switching power supply converting an input voltage applied between an input terminal and ground into an output voltage comprising:

an inductive means having a pair of terminals and a tap coupled to the input terminal for attaining a pair of currents and providing the output voltage;

a pair of rectifying means coupled to ground and having a pair of terminals for rectifying the currents;

a pair of switching means with one switching means coupled to one inductive means terminal for selectively applying the respective current to one rectifying means terminal and with the other switching means coupled to the other inductive means terminal for selectively applying the respective current to the other rectifying means terminal; and a pair of capacitive means for storing auxiliary voltages with one capacitive means coupled between the one inductive means terminal and the other rectifying means terminal, and with the other capacitive means coupled between the other inductive means terminal and the one rectifying means terminal.

16. Switching power supply of claim 15 further including a second rectifying means coupled to the tap for rectifying a second input voltage and providing first said input voltage.

17. Switching power supply of claim 15 further including a second inductive means coupled in series with the tap for attaining a second current.

18. Switching power supply of claim 15 wherein first said inductive means includes:

a primary inductive means for attaining the currents; and a secondary inductive means electromagnetically coupled to the primary inductive means for providing the output voltage.

19. Switching power supply of claim 15 further including:

a second rectifying means coupled to the inductive means for rectifying first said output voltage;

a second inductive means coupled to the second rectifying means for attaining a second current; and a second capacitive means coupled in series with the second inductive means for providing a second output voltage in response to the second current.

* * * * *